(12) United States Patent
Wu et al.

(10) Patent No.: US 10,609,440 B1
(45) Date of Patent: Mar. 31, 2020

(54) TIMING DATA ANOMALY DETECTION AND CORRECTION

(71) Applicant: Amazon Technologies, Inc., Seattle, WA (US)

(72) Inventors: Yongjun Wu, Bellevue, WA (US); Ilya Vladimirovich Brailovskiy, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/003,679

(22) Filed: Jun. 8, 2018

(51) Int. Cl.
  *H04N 21/00* (2011.01)
  *H04N 21/43* (2011.01)
  *H04N 19/513* (2014.01)

(52) U.S. Cl.
  CPC ....... *H04N 21/4302* (2013.01); *H04N 19/513* (2014.11)

(58) Field of Classification Search
  CPC .................. H04N 21/4302; H04N 19/513
  See application file for complete search history.

(56) References Cited

U.S. PATENT DOCUMENTS

| | | | |
|---|---|---|---|
| 10,318,813 B1* | 6/2019 | Pereira | G10L 15/142 |
| 2011/0228852 A1* | 9/2011 | Budagavi | H04N 19/105 |
| | | | 375/240.16 |
| 2014/0301486 A1* | 10/2014 | Liao | H04N 19/87 |
| | | | 375/240.27 |
| 2015/0364158 A1* | 12/2015 | Gupte | G11B 27/3081 |
| | | | 386/223 |
| 2017/0300765 A1* | 10/2017 | Dojcinovic | G06K 9/00805 |

* cited by examiner

Primary Examiner — Zhihan Zhou
(74) Attorney, Agent, or Firm — Weaver Austin Villeneuve & Sampson LLP

(57) ABSTRACT

Techniques are described for detecting timing data anomalies in streaming video. Techniques are also described for adjusting playback operations based on detecting possible timing data anomalies.

22 Claims, 5 Drawing Sheets

TIMING DATA ANOMALY DETECTION AND CORRECTION

BACKGROUND

During media content streaming over wireless and/or wired networks, variability in network conditions results in jitter, loss, or duplication of received data. In cases where data with timing and/or synchronization information are not received, or are received but cannot be processed correctly, inaccurate estimation of media content timing data relative to a presentation timeline can distort media content playback. For example, estimated timing data for a video frame that results in a smaller elapsed time relative to the correct timing data causes an acceleration effect, whereas the opposite results in a slowdown effect. These acceleration and slowdown effects can detract from quality of playback for video and audio content.

DETAILED DESCRIPTION

This disclosure describes techniques for detecting and correcting erroneous or missing timing data for media content playback. The timing data anomaly detection and correction techniques include comparing motion data for different temporal portions of the media content, comparing estimated playback times of the different portions of the media content relative to a presentation timeline, and determining if the difference in motion data conforms to a constraint relative to the difference in playback times. This disclosure also describes techniques for timing data correction, making a new request for timing data, or modifying playback to circumvent timing data anomalies, etc., when incorrect timing data is detected by a media content playback device. An example will be instructive.

Figure 1:
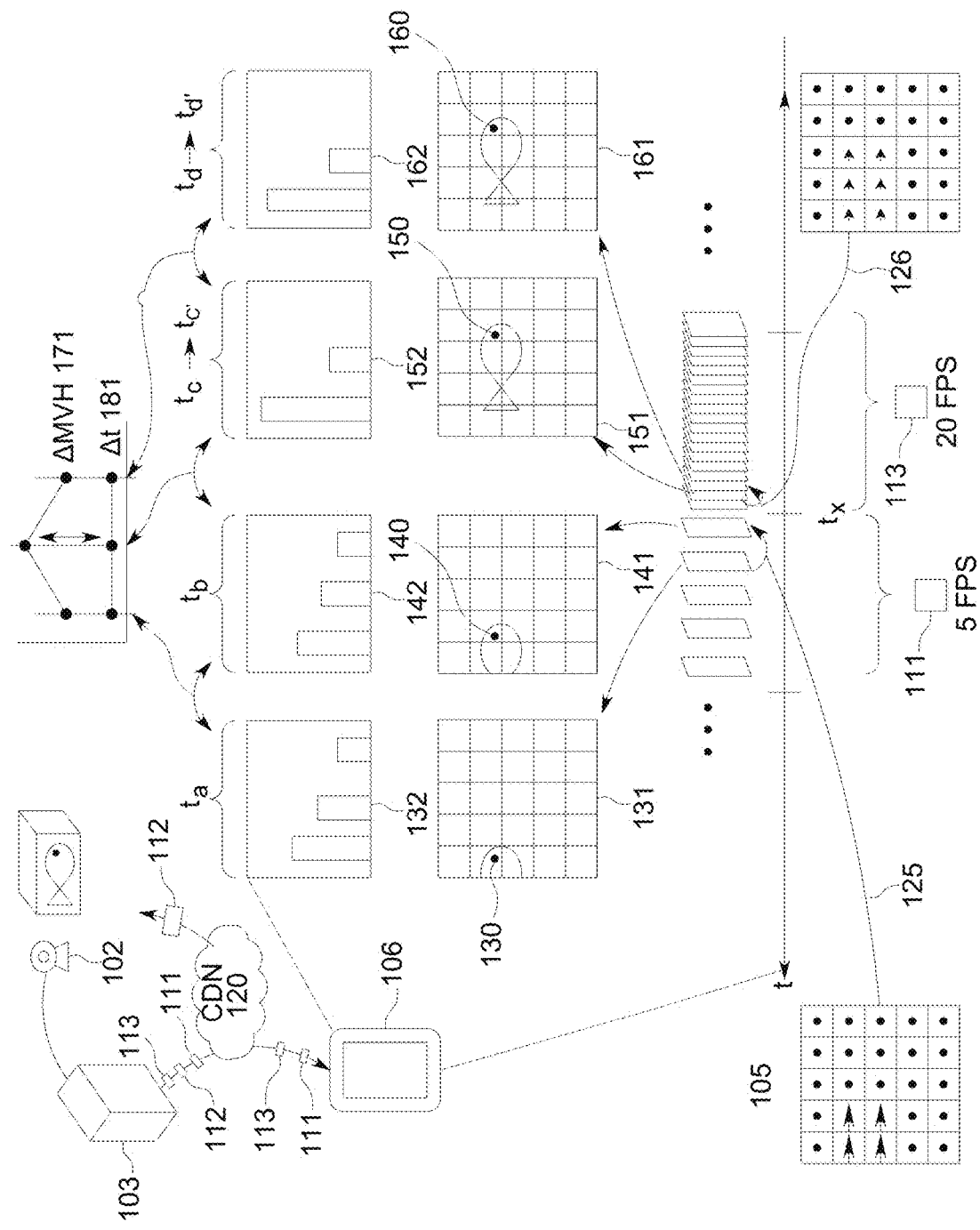
FIG. 1 illustrates an example of timing data anomaly detection using motion data.

FIG. 1 illustrates an example of timing data error detection and correction. In FIG. 1, media content 105 corresponds to a live video stream of David's prize-winning arowana fish. David is out of town for a business trip, but is able to monitor the health of the arowana, such as the swimming patterns and gill breathing rate, by periodically using viewer device 106 to log into media server 103. Media server 103 handles requests for media content fragments for a live video stream generated by, for example, Internet Protocol (IP) camera 102 pointed at David's fish tank.

Viewer device 106 determines timestamps for video frames in the received fragments relative to a presentation timeline 115. The timestamps for playing back video frames can be used to account for changes in content delivery network (CDN) 120 characteristics, such as, for example, when the order of fragments received at viewer device 106 do not match the order of fragments transmitted by media server 103 due to variations in network latency. The timestamps can also account for changes in the characteristics of media content 105, such as, for example, a reduction in frames per second (fps) driven by the need to increase exposure time due to low light conditions.

In a class of implementations, media server 103 relies on various mechanisms to maintain the integrity of the transmitted data for determining timestamps. For example, media server 103 can rely on the use of the Transmission Control Protocol (TCP) networking layer, which provides error checking functionality, to establish reliable transmission of timing data. In some scenarios, such as when media server 103 uses the Universal Datagram Protocol (UDP) networking layer instead, which does not provide error checking functionality, timing data can be lost, corrupted, or miscalculated by viewer device 106. It should be appreciated that timing data can be lost, corrupted, or miscalculated as a result of simulated or actual network congestion.

However, even in scenarios where correct timing data is not received, the data corresponding to video content can be received and decoded without image corruption. For example, a media playback application on viewer device 106 can recognize that a portion of a media content elementary stream (e.g., a segment of the MPEG-2 transport stream under the MPEG-DASH streaming protocol) has been completely received, and proceed to decode the corresponding fragments. However, the media playback application on viewer device 106 may not recognize that data separate from the media content elementary stream was unsuccessfully received.

For example, media server 103 periodically sends a quality of service summary (e.g., the sender report (SR) under the Real-Time Transport Protocol Control Protocol (RTCP)) to report the number of packets sent during a time interval. If viewer device 106 fails to receive the UDP packets carrying the quality of service summary, viewer device 106 may not detect that the number of received packets differs from the number of packets sent by media server 103. In turn, viewer device 106 may not detect the unsuccessful reception of timing data for the successfully received media content elementary stream. In such scenarios, viewer device 106 may make determinations of timestamps that differ from the actual timestamps for the received video frames.

The estimated value of timestamps that differ from the actual timestamps can arise in a variety of scenarios. For example, in FIG. 1, media server 103 provides adaptive streaming capabilities by changing the frame rate in response to network conditions. When available bandwidth is low, such as before time tx, media server 103 configures camera 102 to use a frame rate of 5 fps. When available bandwidth increases, such as after time tx, media server 103 configures camera 102 to switch to a higher frame rate of 20 fps. In a class of implementations, to conserve the number of bits used, media server 103 may not encode a timestamp into every video frame, and instead sends timing update message 112 to viewer device 106 separate from the media content 105. For example, when available bandwidth has increased at time tx, media server 103 increases the frame rate of camera 102 and sends a timing update message 112 to viewer device 106 indicating the change in fps.

Continuing the example, prior to time tx, viewer device 106 determines timestamps for video frames in fragment 111 based in part on an elapsed time calculated using 5 fps (0.2 seconds between each video frame). Following time tx, the correct elapsed time between each video frame is calculated using 20 fps (0.05 seconds between each video frame). However, because viewer device 106 failed to receive timing update message 112 indicating the change from 5 fps to 20 fps, viewer device 106 continues to determine the timestamps for video frames after time tx (e.g., fragment 113) using the prior frame rate of 5 fps. As a result, the determined timestamps for frames in fragment 113 are separated in time by an extra 0.15 seconds (0.15=0.2-0.05 seconds). Because of the incorrectly calculated extra time that elapses between each video frame for fragment 113, the motion of the objects in fragment 113 are slowed down relative to playback using the correct timestamps. For example, the display of media content 105 corresponds to a slowdown in the apparent motion of David's arowana, which inaccurately portrays the arowana as sick due to the lethargic swimming velocity and slower gill movement.

It should be appreciated that in the opposite scenario, where fps is decreased due to a drop in available network bandwidth, because of the incorrectly calculated decrease in time that elapses between each video frame, the motion of objects are sped up relative to playback using the correct timestamps.

It should further be appreciated that while the preceding example involved a change in fps, incorrect determinations of timestamps can also occur for a variety of other reasons, such as software bugs, data transmission errors, malicious tampering, resorting to default values when timing data is not received, and so forth. In each scenario, the slowing down or speeding up of motion detracts from the viewing experience of the media content. It should be noted that the disclosed techniques for timing data anomaly detection and correction are applicable for incorrect timestamps irrespective of the cause, and irrespective of whether they result in a speed up or slow down of apparent motion.

In FIG. 1, viewer device 106 performs timing data anomaly detection. The timing data anomaly detection uses, for example, inter-frame motion data included in the correctly received media content elementary stream.

The motion data includes a spatial and temporal characterization of portions of a video frame relative to portions of a different video frame. For example, fragment 111 depicted in FIG. 1 is a group of pictures (GOP) that includes frame 131 and frame 141, with each frame having macroblocks, and each macroblock having at least one prediction block. Block 130 of video frame 131 corresponds to the eye of the arowana, and block 140 corresponds to the same eye in a different location in video frame 141. Motion data 125 includes information spatially characterizing the displacement of block 140 in frame 141 relative to block 130 in frame 131, such as with a motion vector indicating distances in the vertical and horizontal directions. It should be noted that the correct spatial displacements of blocks across the frames in fragment 111 can be established using the correctly received motion data 125.

Motion data 125 also includes information temporally characterizing the relationship of frame 141 to frame 131, such as by specifying a motion prediction direction for a particular prediction block in a frame. For example, motion data 125 can indicate that block 140 is a forward prediction with reference to block 130, meaning frame 141 should be later than frame 131 in a presentation timeline (e.g., frame 141 is a predicted (P) frame that references the earlier frame 131). As another example, motion data 125 can indicate that block 130 is a reverse prediction with reference to block 140, therefore frame 141 should again have a timestamp relative to a presentation timeline that is later than frame 131 (e.g., frame 131 is a bidirectional predicted (B) frame that references the later frame 141). Thus, the correct temporal ordering of frames in fragment 111 can be established using the correctly received motion data 125.

However, as described earlier, the determined timestamps for frames in fragment 113, such as frame 151 and frame 161, may be incorrect due to, for example, a change in fps at time tx and viewer device 106 being unaware of this change due to a dropped UDP packet for timing update message 112.

In FIG. 1, viewer device 106 performs timing data anomaly detection by comparing changes in inter-frame motion data with changes in timestamps.

Inter-frame motion data can be represented in a variety of ways. For example, the motion vector data for frame 131 can be abstracted as an array of five values {X-top left, Y-top left, X displacement, Y displacement, reference frame ID}. Each set of five values indicates, for a particular block in frame 131, an identifier for a reference frame for motion prediction, X and Y pixel coordinates of the top left of the reference block in the reference frame, and the X and Y pixel displacement for estimating the location of the block in frame 131. It should be appreciated that this example abstraction is for illustrative purposes, and a wide variety of motion data representations can be used for the disclosed techniques.

In certain implementations, vector amplitudes are calculated for the X displacement and Y displacement for each block within a video frame, and the frequencies of vector amplitudes within specific bin intervals are counted to generate a motion vector histogram for a frame. For example, motion vector histogram 132 for frame 131, after normalizing for the number of blocks, can be abstracted as a two dimensional vector {[amplitude 0-2, 50%], [amplitude 2-4, 30], [amplitude 4-6, 0%], [amplitude 6-8, 20%]}. The motion vector histogram 132 can be interpreted as 50% of the blocks in frame 131 correspond to a motion vector amplitude of zero to two pixels, 30% of the blocks are in the interval of two to four pixels, 0% of the blocks are in the interval of 4 to 6 pixels, and 20% of the blocks are in the highest interval of 6 to 8 pixels. In other words, in the live stream corresponding to the arowana, most blocks correspond to little motion (most of the fish tank scene is stationary or slowly moving), and the majority of the remaining blocks correspond to the motion of the arowana (the fastest moving object in the scene). As the arowana continues to swim with the same velocity during the time intervals for fragment 111, the motion vector histograms for the corresponding frames remain similar to the motion vector histogram 132 for frame 131.

After time tx, which is when the change in fps occurs, the arowana continues to swim with the same velocity. The fps change is reflected in a change in the motion vectors in motion data 126. Specifically, the actual elapsed time between adjacent frames in fragment 113 changes from 0.2 to 0.05 seconds, corresponding to a division by 4 relative to fragment 111. Because of this reduction in the elapsed time, the value of the pixel displacement for a block in adjacent frames is also reduced by a division by 4. For instance, for frame 131 in fragment 111 at 5 fps, a block in the eye of the arowana has a motion vector amplitude of 8 pixels relative to an adjacent frame. For frame 151 in fragment 113 at 20 fps, a block in the eye of the arowana, which is traveling at the same velocity as before, is displaced by a lower value of 2 pixels (8/4=2) relative to an adjacent frame, since there is less elapsed time between frames. Because motion vector amplitudes in the interval of 6-8 pixels are divided by 4 and therefore scaled to be in the interval of 6-8 pixels, whereas the motion vector amplitudes in the interval of 0-2 pixels, when divided by 4, remain in the same interval of 0-2 pixels, motion vector histogram 152 for frame 151 is a redistribution of motion vector amplitudes relative to motion vector histogram 132 for frame 131. Specifically, the number of motion vector amplitudes in the interval of 6-8 pixels has decreased, and the number of motion vector amplitudes in the interval of 0-2 pixels has increased. The difference in the distribution of the motion vector amplitudes in motion vector histogram 152 and motion vector histogram 132 can be determined based on, for example, the least squares metric to determine a motion vector histogram difference 171. In some implementations, motion vector histogram difference 171 can be tracked over a series of frames, as illustrated in the upper trace of the scatterplot in FIG. 1.

Motion vector histogram difference 171 is compared to timing difference 181. As one example, during fragment 113, timing difference 181 is calculated as 0.2 seconds based on the difference between initially determined timestamps for adjacent frames (e.g., timestamp tb–timestamp ta). Beginning at time tx, viewer device 106 incorrectly treats received fragment 113 as a 5 fps video stream, determines initial timestamps for video frames within fragment 113 based on this faulty assumption, and accordingly sets timing difference 181 to 0.2 seconds for frame 151. Thus, before and after the time tx, there is no change in timing difference 181, which remains at 0.2 seconds (as conceptually represented by the lower trace in the scatterplot). However, at the time tx, there is a change in motion vector histogram difference 171, based on the motion vector amplitude redistribution illustrated by the difference between motion vector histogram 152 and motion vector histogram 132.

Viewer device 106, upon detecting that motion vector histogram difference 171 does not conform to a constraint based on the magnitude of changes in timing difference 181 (e.g., a decrease or increase in the elapsed time between timestamps), signals a possible anomaly in the initially determined timestamp for frame 151. For example, for no change in timing difference 181, the large motion vector histogram difference indicates a possible timing data anomaly (e.g., viewer device 106 does not receive a message regarding a change in fps).

Based on the presence of a possible timing data anomaly, viewer device 106 can take various actions, including reconciling the possible timing data anomaly with other contextual information (e.g., a known scene transition), send a request for associated timing data, attempt to correct the timing data anomaly by modifying the estimated timestamp value (e.g., modifying timestamp tc to tc', and td to td'), and/or playback a subset bitstream excluding the frame with a timing data anomaly.

The disclosed techniques allow for a viewer device to detect and respond to timing data anomalies, and therefore provide increased quality and robustness of streaming video performance in the presence of conditions, such as data loss in a delivery network, that contribute to incorrect timing synchronization for media content.

Figure 2:
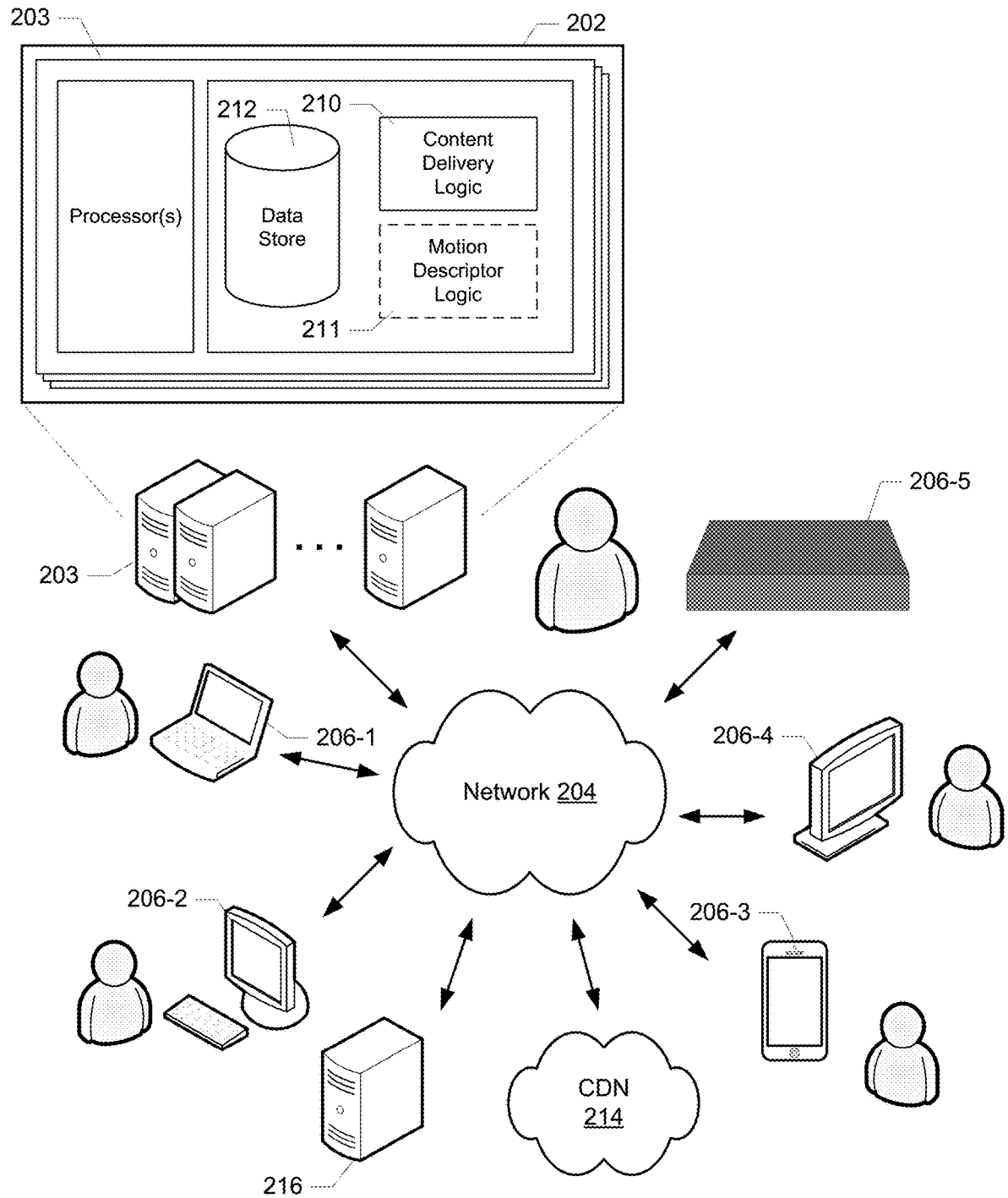
FIG. 2 illustrates an example of a computing environment for timing data anomaly detection using motion data.

FIG. 2 illustrates an example of a computing environment in which video streams may be encoded for transmission via network 204 to a variety of viewer devices (206-1 through 206-5) implementing the techniques described herein. Service 202 may conform to any of a wide variety of architectures such as, for example, a services platform deployed at one or more co-locations, each implemented with one or more servers 203. Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, and so on. Viewer devices 206 may be any suitable device capable of connecting to network 204 and generating and/or consuming content streams. Such devices may include, for example, mobile devices (e.g., cell phones, smart phones, tablets, and the like), personal computers (e.g., laptops and desktops), set top boxes (e.g., for cable, satellite, and online systems), smart televisions, gaming consoles, wearable computing devices (e.g., smart watches or smart glasses), internet-connected cameras, voice-activated smart home devices (e.g., with integrated personal digital assistants), etc.

At least some of the examples described herein contemplate implementations based on computing models that enable on-demand network access to a shared pool of computing resources (e.g., networks, servers, storage, applications, and services). As will be understood, such computing resources may be integrated with and/or under the control of the same entity controlling service 202. Alternatively, such resources may be independent of service 202, e.g., on a platform under control of a separate provider of services and/or computing resources with which service 202 connects to consume resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

It should also be noted that implementations are contemplated in which, in addition to content delivery logic 210, service 202 may include other types of logic (not shown) involved in the delivery of content as part of a video-on-demand service or a live/broadcast video service.

In addition to encoding video content and providing access to video streams, service 202 may also include a variety of information related to the video content (e.g., other associated metadata and manifests in data store 212 which service 202 uses, or to which service 202 provides access or transmits to viewer devices 206).

Data store 212 may also include data representing motion descriptors generated by motion descriptor logic 211. Motion descriptors provide information describing motion separately from the motion prediction vector data within the media content elementary stream. For example, the motion descriptors characterize the level of action, the movement of the camera, motion trajectories, warping parameters, and so forth. In certain implementations, motion descriptors may conform to parameters described in the MPEG-7 standard. For example, the motion descriptors may include a camera motion descriptor characterizing movement along an optical axis (dolly forward/backward), horizontal and vertical rotation (panning, tilting), horizontal and vertical transverse movement (tracking, booming), change of the focal length (zooming), and rotation around the optical axis (rolling), a motion activity descriptor indicating the intensity (a high-speed car chase versus a weather forecast), and/or a parametric motion descriptor describing the global motion of video objects using translation, scaling, affine, perspective, or quadratic parametric models. In a class of implementations, the motion descriptors are used to increase or decrease the confidence associated with the detection of a possible timing data anomaly. For example, if the motion activity descriptor indicates a sudden change from low to high intensity motion, or from slow to rapid camera movement, a large change in the motion vector histograms causing a detected timing data anomaly event may be ignored.

In some cases, any of the information in data store 212 may be provided and/or hosted by one or more separate platforms, e.g., CDN 214 or other third-party platform. It should be noted that, while logic 210 and 211, and data store 212 are shown as integrated with service 202, implementations are contemplated in which some or all of these operate remotely from the associated service, and/or are under the control of an independent entity. Those of skill in the art will understand the diversity of use cases to which the techniques described herein are applicable.

Figure 3:
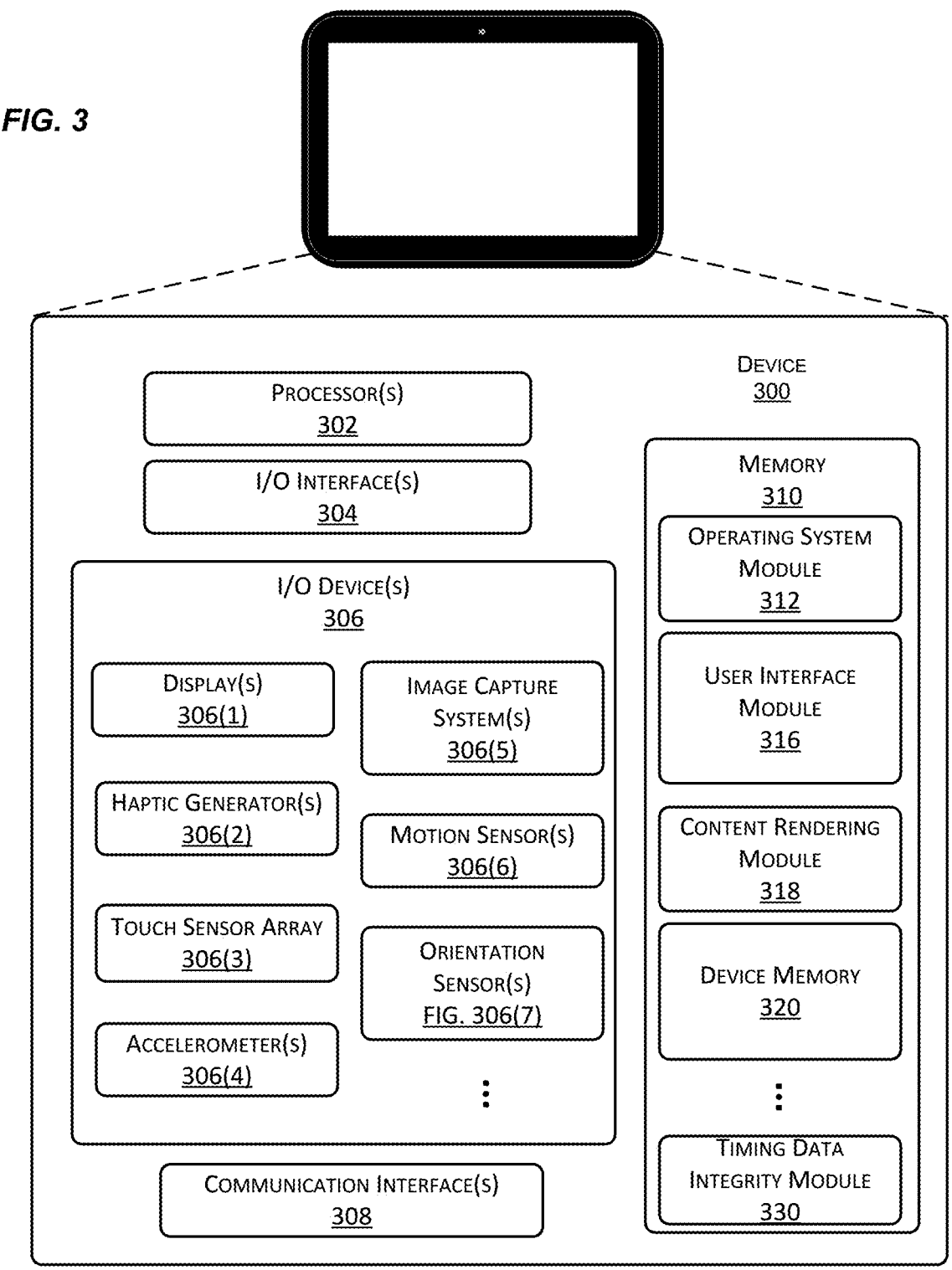
FIG. 3 is simplified block diagram of a viewer device in which various implementations of timing data anomaly detection using motion data may be practiced.

A block diagram of an example of a viewer device 300 suitable for use with various implementations is shown in FIG. 3. Viewer device 300 may include a wide variety of device types. In FIG. 3, viewer device 300 is depicted as a tablet device and includes one or more single or multi-core processors 302 configured to execute stored instructions (e.g., in device memory 320). Viewer device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface (e.g., an HDMI interface), and so forth. I/O interface(s) 304 is coupled to one or more I/O devices 306 which may or may not be integrated with viewer device 300.

Viewer device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a WiFi LAN and a Bluetooth PAN. Viewer device 300 also includes one or more buses or other internal communications hardware or software (not shown) that allow for the transfer of data and instructions between the various modules and components of the device.

Viewer device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of viewer device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316, a content rendering module 318, and other modules. Memory 310 also includes device memory 320 to store a wide variety of instructions and information using any of a variety of formats including, for example, flat files, databases, linked lists, trees, or other data structures. Such information includes content for rendering and display on display 306(1) including, for example, any type of video content. In some implementations, a portion of device memory 320 may be distributed across one or more other devices including servers, network attached storage devices, and so forth.

In some implementations, motion data within the media content elementary stream is analyzed by timing data integrity module 330. For example, timing data integrity module 330 extracts motion vector data, or receives motion vector data from other modules, such as content rendering module 318, and generates motion vector histograms. Timing data integrity module 330 estimates timestamps, or receives timestamps from other modules (e.g., content rendering module 318), and compares changes in motion vector histograms with changes in timestamps. In some implementations, timing data integrity module 330 calculates thresholds for possible timing data anomalies and determines conformance to these thresholds. In certain implementations, timing data integrity module 330 performs averaging or other statistical characterizations of changes in timestamps and/or motion vector histograms over one or more video frames. Timing data integrity module 330 can implement logic for analyzing received media content or network conditions, or receive such information from other modules, to facilitate adjusting playback operations when detecting a possible timing data anomaly. For example, timing data integrity module 330 can receive an indication that a particular video frame corresponds to a scene transition, and can either bypass timing data integrity analysis, or ignore an indication of a possible timing data anomaly for that frame.

It will be understood that viewer device 300 of FIG. 3 is merely an example of a device with which various implementations enabled by the present disclosure may be practiced, and that a wide variety of other devices types may also be used (e.g., devices 206-1 to 206-5). The scope of this disclosure should therefore not be limited by reference to device-specific details.

Figure 4:
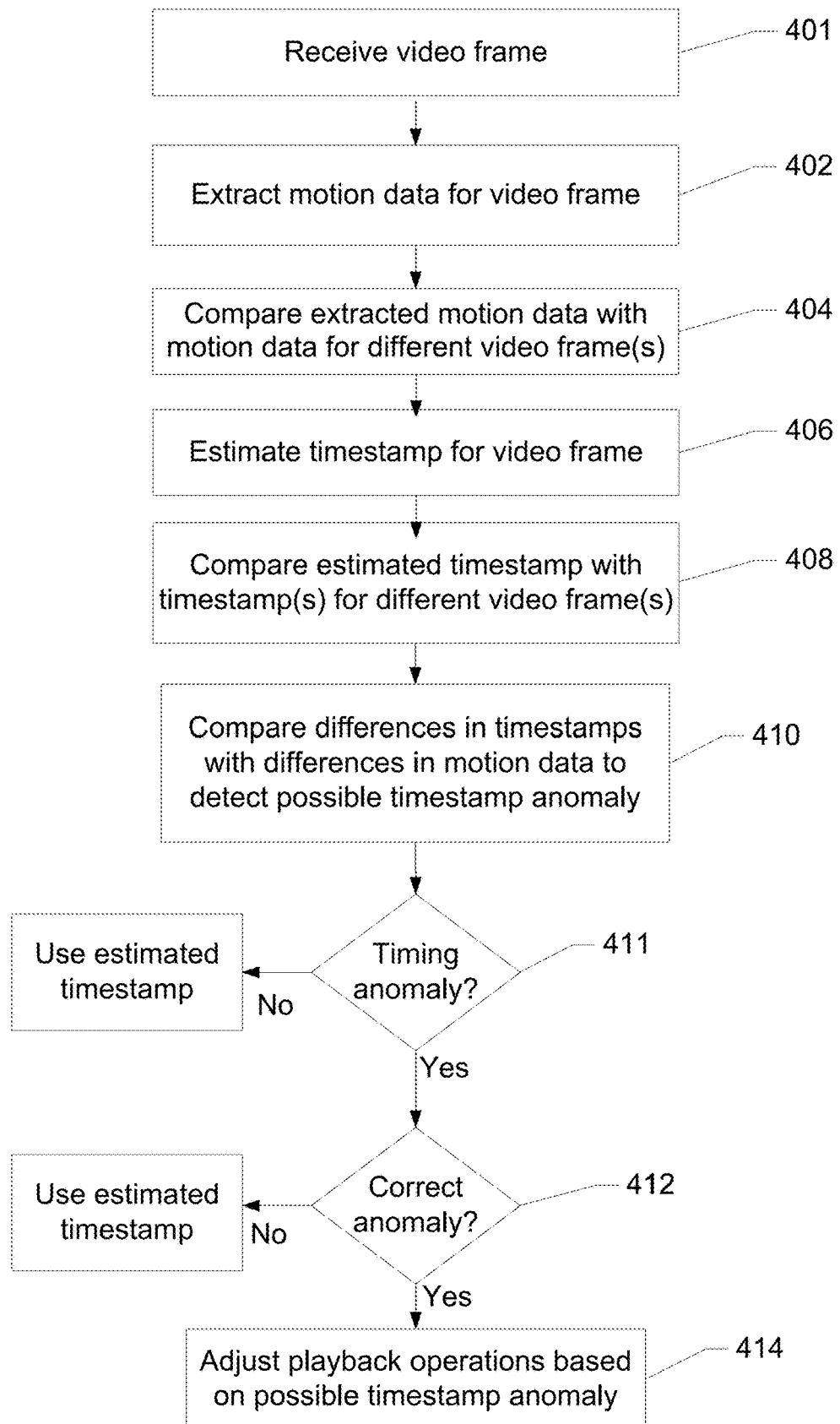
FIG. 4 is a flowchart illustrating timing data anomaly detection using motion data.

FIG. 4 is a flowchart illustrating timing data anomaly detection using motion data. At 401, a viewer device receives a video frame and motion data representing a relationship between portions of the video frame relative to a different video frame. The relationship can be based on, for example, compression using motion compensation techniques where the relationships between different video frames include predictive (P) frames that use data from previous frames, and bidirectional predictive (B) frames that use both previous and subsequent frames for references. In some implementations, the motion data may reference a frame that is not immediately adjacent. For example, if a P frame refers to a reference frame that is two frames earlier, the motion vectors can be scaled accordingly, such as by dividing the vector amplitudes by two. The disclosed techniques are compatible with video frames from any of a wide variety of video fragment structures (e.g., IPPP . . . P, IPBP . . . P, etc.).

It should be appreciated that a B frame may be processed in a variety of ways. For example, the B frame may be treated for the purpose of timing data anomaly detection to be the same as a P frame, where motion vectors for only the prediction blocks that are forward predicted are processed. In another example, the forward prediction blocks and the reverse prediction blocks may be processed in different motion vector histograms, and nonconformance to thresholds in one or both histograms can indicate a possible timing data anomaly. In yet another example, both forward and reverse prediction blocks may be included in one motion vector histogram, such as, for example, a histogram with both negative and positive amplitude values.

In some implementations, such as an intra-coded (I) frame where no inter-frame motion data is received from the media server, a viewer device can perform motion compensation analysis to derive motion vectors relative to at least one different frame that has previously been decoded. For example, for a fragment having a frame structure of IPPIPP . . . , the decoded second I frame can be analyzed for motion data relative to the decoded first or second P frame, which each have corresponding motion data. As another example, for a fragment having a frame structure of any first decoded I frame in the fragment can be analyzed for motion data relative to a second decoded I frame in the fragment. It should be appreciated that the second decoded I frame is analyzed for motion data relative to a third I frame, such that there are motion data for two different video frames, namely the first decoded I frame and the second decoded I frame, to compare. It should further be appreciated that in implementations where the viewer device performs motion analysis, the reference frame may be in the same or a different fragment or group of pictures (GOP). The motion vectors generated by the viewer device can be used as inputs to the timing data anomaly detection process.

The disclosed techniques are compatible with temporal segments of media content having objects with continuous motion, in contrast to objects that undergo rapid changes in motion or appear or disappear in a video frame (e.g., a scene transition). The media content can be generated based on a wide variety of sources, such as, for example, manually animated content, computer animated content, camera captured content, compositions of natural objects (e.g., camera captured) and synthetic objects (e.g., text, computer graphics). In some implementations, a viewer device can adaptively enable/disable timing data anomaly detection based on contextual information, such as MPEG-7 motion descriptors or closed captioning information indicating, for example, a scene transition or a dynamically inserted advertisement.

It should be appreciated that the video frame and the corresponding motion data can apply to both two-dimensional or three-dimensional (e.g., virtual reality) video content. It should further be appreciated that the disclosed timing data anomaly detection techniques are compatible with both live and on demand streaming video, and are compatible with various streaming software packages, APIs, and server architectures (e.g., WebRTC, Kurento, etc.). The disclosed timing data anomaly correction techniques are applicable to video, audio, and other forms of media content. For example, a corrected timestamp for a video segment can be applied to the video and/or associated subtitles, audio fragments, related metadata (e.g., Amazon X-ray information), and so forth.

At 402, the viewer device extracts motion data for the video frame. In some implementations, motion data extraction occurs after video frame decoding. In various implementations, motion data extraction can occur in parallel with video frame decoding operations. For example, motion data in the media content elementary streams for a variety of video coding formats (AVC, HEVC, VP8, VP9, AV1, etc.) can be extracted without fully decoding associated video frames. The disclosed techniques are agnostic to the specific implementation for the motion estimation algorithm, including but not limited to the Exhaustive Search, Optimized Hierarchical Block Matching (OHBM), Three Step Search, Two Dimensional Logarithmic Search, New Three Step Search, Simple and Efficient Search, Four Step Search, Diamond Search, and Adaptive Rood Pattern Search algorithms. It should be appreciated that the disclosed techniques are agnostic to coding, compression, and/or encryption techniques that are applied to the motion data itself.

At 404, the viewer device compares the extracted motion data with motion data for a different video frame to determine a difference. In some implementations, prior to comparison, the motion data is converted to an aggregate form of representation, such as by determining a frequency distribution, or a statistical measure, or calculating block averages, and so forth. For example, the motion data may be converted to a motion vector histogram, where quantities of motion vectors with amplitudes within particular intervals of pixel displacements are counted. In certain implementations, the X and Y components of the motion vectors are used to generate separate motion vector histograms. In various implementations, a three-dimensional motion vector histogram is generated (e.g., X amplitude, Y amplitude, quantity). It should be noted that while particular features of the disclosed techniques are discussed herein using the example of a motion vector histogram, such features can also be implemented using other aggregate representations of motion data.

It should be appreciated that less than all of the motion vectors for a video frame can be processed. For example, motion vectors associated with noisy portions of the video frame, or portions that are not displayed due to display size constraints, are excluded for the purposes of timing data anomaly processing. As another example, only motion vectors for a particular region of interest(s) are included. In certain implementations, a single motion vector (e.g., a video frame where there is motion only for one predictive block, or motion vectors are filtered down to a single motion vector) can be used for timing data anomaly detection.

It should be appreciated that the quantization of the motion vector granularity (e.g., half pixel, quarter pixel, etc.), number of motion vectors, range of the intervals of pixel displacements, the number of intervals, etc., can be varied based on the computational capabilities and runtime constraints at the viewer device.

In a class of implementations, dimensions of the motion vector histogram are normalized. For example, the amplitude of motion vectors can be normalized to account for differences in the number of intervening frames between, for example, a P frame and the corresponding reference frame. For instance, if a P frame refers to a reference frame that is the immediately preceding frame, the motion vectors are not scaled. However, for a different P frame that refers to a reference frame that is two frames earlier, the motion vectors can be scaled accordingly, such as by dividing the vector amplitudes by two. As another example, the number of motion vectors can be normalized to account for variations in the number of prediction blocks caused by, for example, changes in image resolution for different segments of an adaptive video stream. For instance, during periods of high network bandwidth, the resolution of streaming video for media content is at 4K resolution (3840×2160 pixels). Assuming the entire image is subdivided into non-overlapping inter-frame prediction blocks that are 16×16 pixels, a 4K video frame will have 32,400 motion vectors. During periods of low network bandwidth, the resolution drops to 1080P (1920×1080 pixels). Assuming the same conditions as before, the number of motion vectors decreases to 8,100.

The number of motion vectors for the 4K and 1080P video frames can be normalized with respect to each other by dividing by, for example, the number of motion vectors within each video frame.

The difference in the distribution of the motion vector amplitudes in different motion vector histograms can be determined based on a variety of metrics. Examples include but are not limited to the least squares, Chi square distance metric, etc., to determine a motion vector histogram difference.

At 406, the viewer device determines a timestamp for the received video frame. It should be appreciated that the estimated timestamp can be relative to various timelines, such as a presentation timestamp (PTS) for a presentation timeline, a decoding timestamp (DTS) for a decoding timeline, and so forth. In some implementations, the media server embeds a timestamp or data for calculating a timestamp for the received video frame into the media content elementary stream. However, the embedded value may be incorrect, or the viewer device may incorrectly calculate the timestamp. In various implementations, no timestamp value is provided, and the viewer device can use one of a variety of techniques to estimate the timestamp for the received video frame. The viewer device can use a default value, a local time reference, or can dynamically calculate a timestamp based on information such as a combination of a timestamp for an earlier frame and a frame per second value. In some implementations, the viewer device can estimate a timestamp based on fragment contextual data, such as audio analysis (e.g., fragments with similar loudness are likely to be adjacent in time) or semantic analysis of closed captioning data (e.g., fragments associated with certain words are more likely to be in a particular order).

In a class of implementations, a timestamp can be determined based on statistical or probabilistic techniques. For example, a static camera monitoring a specific area (e.g., a surveillance camera) provides a historical record of motion vector histograms corresponding to trusted timestamp values (e.g., periods where there is high network bandwidth, no packet losses, corroborated timing estimates, etc.). Patterns or similarities in the motion vector histograms can be identified using any of a variety of machine learning techniques, such as, for example, a two layer perceptron network. During instances where a timestamp is not available, a motion vector histogram for a video frame is input to the artificial network to obtain an estimated timestamp for the video frame.

At 408, timestamps for different video frames are compared to obtain a timing difference. The timing difference can be determined in a variety of ways, such as by using the elapsed time based on the initially determined timestamps, using changes in the elapsed time, and so forth. In certain implementations, timestamp differences can be determined based on statistical or probabilistic techniques. For example, an estimated timestamp can be compared to a statistical measure (e.g., average, etc.) of timestamps within a window of n preceding and/or m subsequent video frames. In some implementations, noise filtering techniques can be applied.

At 410, the timing difference is compared to the motion vector histogram difference. At 411, a possible timing anomaly can be detected based on various permutations in the magnitude of the timing difference relative to the magnitude of the motion vector histogram difference.

For example, for a small change in timing difference (e.g., 10 milliseconds), if the calculated motion vector histogram difference is above a threshold, a possible timing anomaly is detected by the viewer device. This may occur, for example, when there is a change in fps that causes the motion vector histogram difference to be large, but the change in the timing difference (e.g., the change in the elapsed time between adjacent video frames) is calculated to be zero because the viewer device is not aware of the change in fps due to a lost packet.

As another example, for a large change in the timing difference (e.g., 100 milliseconds), if the motion vector histogram difference is below a threshold, a possible timing anomaly is detected. This may occur, for example, when the video frame being assessed corresponds to the smooth continuation of the motion in the preceding video frame (i.e., motion vector histogram difference is small or zero), but the timestamp difference deviates from an average timestamp difference calculated for the past several frames. Such scenarios may arise because of, for example, an incorrect embedded timestamp or corrupted timing data.

If no timing anomaly is detected at 411, the estimated timestamp is used for processing the video frame for playback.

If a timing anomaly is detected at 411, referring to FIG. 1, FIG. 4, and FIGS. 5A-C, viewer device 106 can take various actions.

At 412, the viewer device may determine whether or not to correct the detected timing anomaly. The viewer device can use the estimated timestamp without performing any correction based on detecting conditions that reconcile the possible timing data anomaly. For example, if based on network measurements, viewer device 106 has a high confidence that the network is performing well and there is a low probability of data being dropped, viewer device 106 may ignore the possible timing data anomaly.

As another example, viewer device 106, based on analysis of the media content 105, may determine that the possible timing data anomaly corresponds to a scene transition or dynamic ad insertion at time tx that contributes to the motion vector histogram difference 171, and therefore ignore the possible timing data anomaly.

Figure 5A:
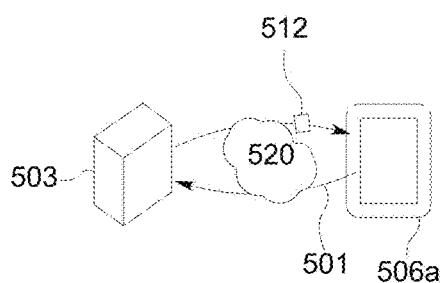
FIGS. 5A-C illustrate examples of adjusting playback operations based on timing data anomaly detection.

At 414, the viewer device can adjust playback operations in response to detecting a possible timing data anomaly. Referring to FIG. 5A, in some implementations, viewer device 506a can send another request 501 to media server 503 for the fragment containing a possible timing data anomaly with the expectation that media server 503 will automatically send associated timing data along with sending the fragment 512 over CDN 520, or viewer device 506a can send a request specifically for the associated timing data.

Figure 5B:
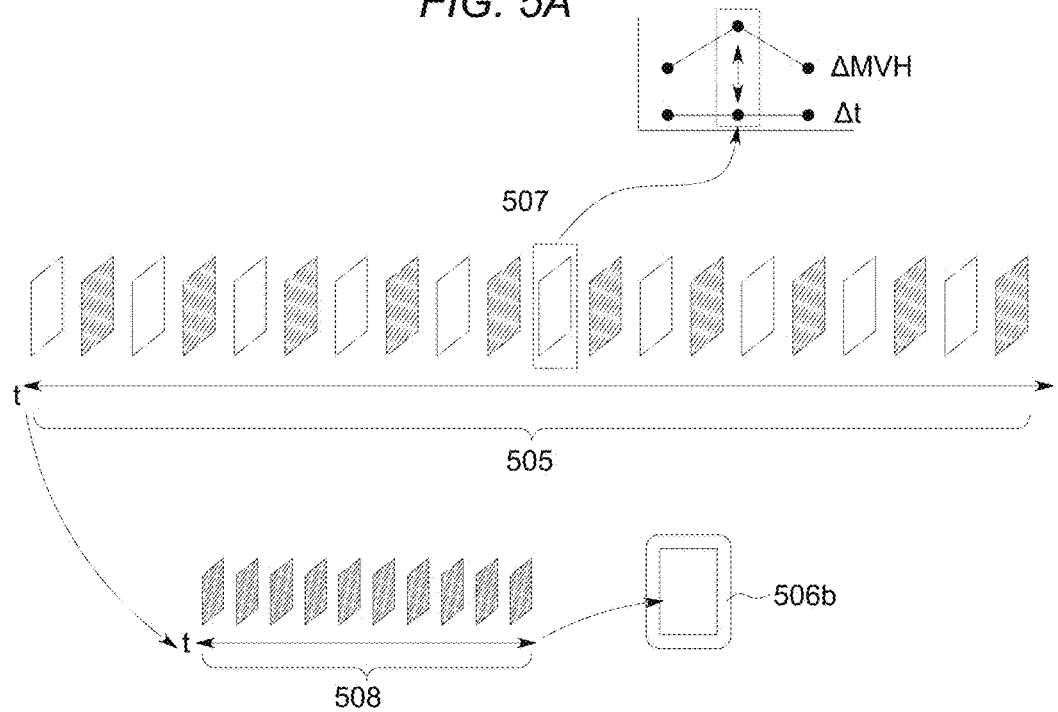

Referring to FIG. 5B, in various implementations, viewer device 506b can circumvent the effect of the video frames with possible timing data anomalies. For example, if video fragment 505 uses temporally scalable video coding, a subset of frames excluding the frame 507 with a timing data anomaly can be selected, such as a 15 fps subset of frames from a 30 fps set of frames. This is illustrated by viewer device 506b playing back the subset of frames 508 represented by the shaded video frames contained within the alternating sequence of shaded and unshaded video frames in video fragment 505.

Figure 5C:
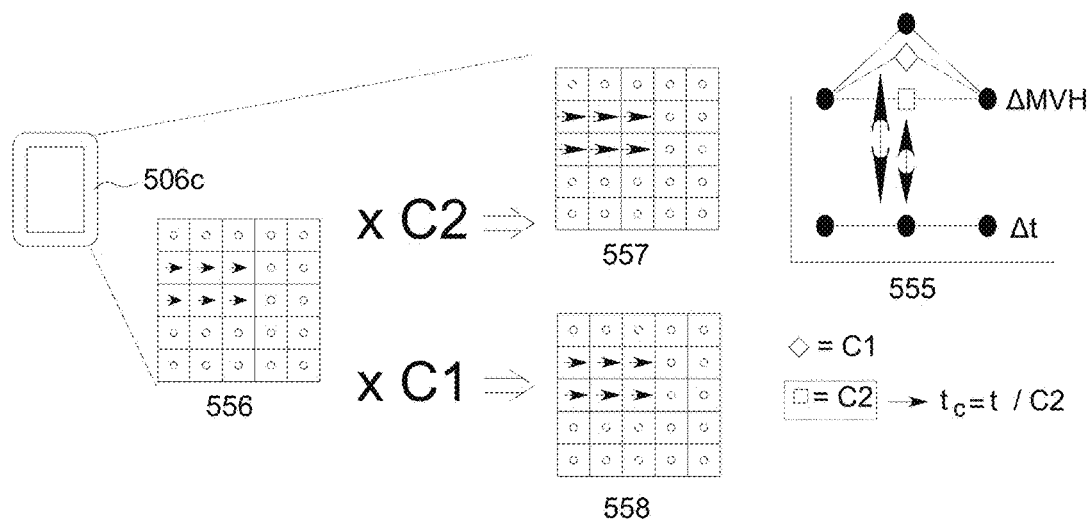

Referring to FIG. 1 and FIG. 5C, in certain implementations, viewer device 506c can attempt to correct the initial determination of the timestamp, such as by scaling the initially determined timestamp with a limited set of coefficients and checking if a particular coefficient reconciles the conditions that triggered the possible timing data anomaly. For example, if media source 102 is limited to fps settings of 5, 10, and 20, viewer device 506c can generate test determinations for the timestamp for frame 151, such as by scaling the elapsed time between adjacent frames for fragment 4 by a division factor of two (representing a transition from 5 to 10 fps), and by scaling the elapsed time between adjacent frames for fragment 4 by a division factor of 4 (representing a transition from 5 to 20 fps). Using the division factor of 4, viewer device 506c can generate an updated motion vector histogram 152 for frame 151, determine that the updated motion vector histogram difference 172 drops to near 0, and therefore determine that the division factor of 4 is the correct coefficient to apply.

This process is visually represented by the motion vector histogram difference and timing difference scatterplot 555. The upper trace corresponding to the motion vector histogram includes data points with circular markers, which corresponds to the calculated values resulting in detection of the possible timing anomaly. The diamond shape data points correspond to the compensated motion vector histogram difference using coefficient C1 based on a division factor of two (transition from 5 to 10 fps), and the square shape data points correspond to division by C2 based on a factor of 4 (transition from 5 to 20 fps). The square shape data point based on C2 results in a flatter trace in the scatterplot 555 relative to C1, therefore viewer device 106 estimates corrected timestamp tc based on the original estimated timestamp t divided by C2. Motion vectors 558 depict the effect of applying the coefficient C1 to the original motion vectors 556 for frame 151, and motion vectors 557 depict applying coefficient C2 to vectors 556. By scaling the length of the motion vectors to be longer, as shown in motion vectors 557 (relative to motion vectors 556 and motion vectors 558), and recalculating the motion vector histogram difference, which is represented by the square shape data point, the change in the motion vector histogram difference is minimized (i.e., a better match with the slower fps rate that preceded frame 151). It should be appreciated that compensation coefficients can be applied in the time domain or the spatial (i.e., motion vector) domain, and can be applied to either the video frame flagged as a potential timing data anomaly, or the video frames used as baseline timestamp or motion vector data values for determining differences.

It should be appreciated that the decision for which type of playback operation adjustment should occur can be based on how soon playback of the video frame with a possible timing data anomaly will occur. For example, if there is sufficient timing margin, timing data may be requested again, whereas if there is insufficient time, a correction may be estimated.

It should be noted that the techniques described herein are agnostic to specific codec implementations, and may be employed for any of a wide variety of video compression standards including, for example, Advanced Video Coding (AVC) or H.264, High Efficiency Video Coding (HEVC) or H.265, AV1, VP8, and VP9, as well as future standards, e.g., H.266.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method, comprising:
    receiving elementary stream fragments representing a plurality of video frames of media content, the media content depicting scenes with motion, the plurality of video frames including a first frame and a second frame;
    determining a first presentation timestamp for the first frame;
    determining a second presentation timestamp for the second frame;
    determining a first difference between the first presentation timestamp and the second presentation timestamp;
    obtaining first motion vector data included in the elementary stream fragments, the first motion vector data representing one or more motion vectors for one or more blocks of image data in the first frame relative to at least one other frame in the plurality of video frames;
    obtaining second motion vector data included in the elementary stream fragments, the second motion vector data representing one or more motion vectors for one or more blocks of image data in the second frame relative to at least one other frame in the plurality of video frames;
    determining a second difference between the first motion vector data and the second motion vector data by:
    calculating a first histogram of amplitudes of the first motion vector data;
    calculating a second histogram of amplitudes of the second motion vector data; and
    calculating a distance metric based on the first histogram and the second histogram; and
    determining that the second difference does not conform to a constraint based on the first difference.

2. The method as recited in claim 1, wherein the first difference represents an elapsed time between the first presentation timestamp and the second presentation timestamp.

3. The method as recited in claim 1, wherein the second difference represents a least square or Chi square distance metric between the first histogram and the second histogram.

4. The method as recited in claim 1, further comprising:
    based on determining that the second difference does not conform to the constraint, modifying the first presentation timestamp or the second presentation timestamp.

5. A method, comprising:
    receiving first data representing a plurality of video frames of media content, the plurality of video frames including a first frame and a second frame;
    determining a first timestamp for the first frame relative to a media timeline for the media content;
    determining a second timestamp for the second frame relative to the media timeline;
    determining a first difference between the first timestamp and the second timestamp;
    obtaining first motion data included in the first data, the first motion data representing one or more motion vectors for one or more blocks of image data in the first frame relative to at least one other frame in the plurality of video frames;
    obtaining second motion data included in the first data, the second motion data representing one or more motion vectors for one or more blocks of image data in the second frame relative to at least one other frame in the plurality of video frames;

determining a second difference between the first motion data and the second motion data; and determining that the second difference does not conform to a constraint based on the first difference.

6. The method as recited in claim 5, wherein determining the second difference includes:

calculating a first histogram of the first motion data;

calculating a second histogram of the second motion data; and calculating a distance metric based on the first histogram and the second histogram.

7. The method as recited in claim 5, wherein the second motion data includes a first subset of motion vectors, the first subset of motion vectors referencing a third frame that is not adjacent to the second frame in the media timeline, the method further comprising:

normalizing the first subset of motion vectors based on a number of intervening frames between the second frame and the third frame.

8. The method as recited in claim 5, wherein the second frame is a bidirectional predictive (B) frame, and further wherein determining the second difference includes:

calculating a first histogram of the second motion data, the first histogram corresponding to forward predicted motion vectors in the second motion data; and calculating a second histogram of the second motion data, the second histogram corresponding to backward predicted motion vectors in the second motion data.

9. The method as recited in claim 5, wherein at least one of the first frame or the second frame is not fully decoded prior to determining that the first second difference does not conform to the constraint.

10. The method as recited in claim 5, wherein determining the first timestamp or determining the second timestamp is based in part on a similarity of the first motion data or a similarity of the second motion data to third motion data associated with a third frame in the plurality of video frames, a third timestamp being determined for the third frame during a period of high reliability in a network for transmitting the plurality of video frames.

11. The method as recited in claim 5, further comprising: based on determining that the second difference does not conform to the constraint, modifying a time for presenting an audio fragment or metadata associated with the second frame.

12. The method as recited in claim 5, further comprising: based on determining that the second difference does not conform to the constraint:

generating third motion data by modifying the second motion data with a first coefficient;

generating fourth motion data by modifying the second motion data with a second coefficient;

determining a third difference between the first motion data and the third motion data;

determining a fourth difference between the first motion data and the fourth motion data;

determining that the third difference is greater than the fourth difference; and based on determining that the third difference is greater than the fourth difference, modifying the second timestamp based in part on the second coefficient.

13. The method as recited in claim 5, further comprising: based on determining that the second difference does not conform to the constraint, play back the first frame using the first timestamp and play back second frame using the second timestamp in response to determining that the second frame corresponds to a scene transition or dynamically inserted content.

14. A system, comprising:

one or more processors and memory being configured to cause:

receiving first data representing a plurality of video frames of media content, the plurality of video frames including a first frame and a second frame;

determining a first timestamp for the first frame relative to a media timeline for the media content;

determining a second timestamp for the second frame relative to the media timeline;

determining a first difference between the first timestamp and the second timestamp;

obtaining first motion data included in the first data, the first motion data representing one or more motion vectors for one or more blocks of image data in the first frame relative to at least one other frame in the plurality of video frames;

obtaining second motion data included in the first data, the second motion data representing one or more motion vectors for one or more blocks of image data in the second frame relative to at least one other frame in the plurality of video frames;

determining a second difference between the first motion data and the second motion data; and determining that the second difference does not conform to a constraint based on the first difference.

15. The system as recited in claim 14, wherein determining the second difference includes:

calculating a first histogram of the first motion data;

calculating a second histogram of the second motion data; and calculating a distance metric based on the first histogram and the second histogram.

16. The system as recited in claim 14, wherein the second motion data includes a first subset of motion vectors, the first subset of motion vectors referencing a third frame that is not adjacent to the second frame in the media timeline, the one or more processors and memory being further configured to cause:

normalizing the first subset of motion vectors based on a number of intervening frames between the second frame and the third frame.

17. The system as recited in claim 14, wherein the second frame is a bidirectional predictive (B) frame, and further wherein determining the second difference includes:

calculating a first histogram of the second motion data, the first histogram corresponding to forward predicted motion vectors in the second motion data; and calculating a second histogram of the second motion data, the second histogram corresponding to backward predicted motion vectors in the second motion data.

18. The system as recited in claim 14, wherein at least one of the first frame or the second frame is not fully decoded prior to determining that the second difference does not conform to the constraint.

19. The system as recited in claim 14, wherein determining the first timestamp or determining the second timestamp is based in part on a similarity of the first motion data or a similarity of the second motion data to third motion data associated with a third frame in the plurality of video frames, a third timestamp being determined for the third frame during a period of high reliability in a network for transmitting the plurality of video frames.

20. The system as recited in claim 14, the one or more processors and memory being further configured to cause:
    based on determining that the second difference does not conform to the constraint, modifying a time for presenting an audio fragment or metadata associated with the second frame.

21. The system as recited in claim 14, the one or more processors and memory being further configured to cause:
    based on determining that the second difference does not conform to the constraint:
        generating third motion data by modifying the second motion data with a first coefficient;
        generating fourth motion data by modifying the second motion data with a second coefficient;
        determining a third difference between the first motion data and the third motion data;
        determining a fourth difference between the first motion data and the fourth motion data;
        determining that the third difference is greater than the fourth difference; and
    based on determining that the third difference is greater than the fourth difference, modifying the second timestamp based in part on the second coefficient.

22. The system as recited in claim 14, the one or more processors and memory being further configured to cause:
    based on determining that the second difference does not conform to the constraint, play back the first frame using the first timestamp and play back second frame using the second timestamp in response to determining that the second frame corresponds to a scene transition or dynamically inserted content.

\* \* \* \* \*